(12) United States Patent
Ban

(10) Patent No.: US 8,805,650 B2
(45) Date of Patent: Aug. 12, 2014

(54) SIMULATION METHOD FOR EVALUATING A GOLF CLUB HEAD

(75) Inventor: Wataru Ban, Chichibushi (JP)

(73) Assignee: Bridgestone Sports Co., Ltd, Tokyo (JP)

( * ) Notice: Subject to any disclaimer, the term of this patent is extended or adjusted under 35 U.S.C. 154(b) by 307 days.

(21) Appl. No.: 13/326,041

(22) Filed: Dec. 14, 2011

(65) Prior Publication Data

US 2012/0166149 A1 Jun. 28, 2012

(30) Foreign Application Priority Data

Dec. 24, 2010 (JP) ................................. 2010-287840

(51) Int. Cl.
| | | |
|---|---|---|
| *G06F 17/50* | (2006.01) | |
| *G06F 7/60* | (2006.01) | |
| *G06F 17/10* | (2006.01) | |
| *G06G 7/48* | (2006.01) | |
| *A63B 69/36* | (2006.01) | |

(52) U.S. Cl.
CPC ........ *A63B 69/3614* (2013.01); *G06F 17/5018* (2013.01); *A63B 2069/3605* (2013.01)
USPC ........................ 703/1; 703/2; 703/9; 473/317

(58) Field of Classification Search
CPC ................... G06F 17/5018; A63B 2069/3605; A63B 2053/0441; A63B 69/3617; A63B 53/10
USPC ....................................... 703/1–2, 9; 473/317
See application file for complete search history.

(56) References Cited

U.S. PATENT DOCUMENTS

| | | | |
|---|---|---|---|
| 5,865,686 A * | 2/1999 | MacGregor ................... | 473/228 |
| 7,076,414 B2 | 7/2006 | Miyori | |
| 7,130,782 B2 | 10/2006 | Miyori et al. | |
| 7,435,089 B2 | 10/2008 | Sato et al. | |
| 7,847,808 B2 * | 12/2010 | Cheng et al. ................... | 345/634 |
| 8,177,659 B1 * | 5/2012 | Ehlers ........................... | 473/305 |
| 8,229,710 B2 * | 7/2012 | Matsunaga et al. .............. | 703/1 |
| 8,229,711 B2 * | 7/2012 | Matsunaga et al. .............. | 703/1 |
| 8,568,247 B1 * | 10/2013 | Ehlers ........................... | 473/305 |
| 8,585,510 B1 * | 11/2013 | Ehlers et al. .................. | 473/305 |
| 2004/0121851 A1 * | 6/2004 | Hsien ............................ | 473/317 |
| 2005/0032584 A1 * | 2/2005 | Van Nimwegen ............ | 473/327 |
| 2011/0192001 A1 * | 8/2011 | Evans et al. ................. | 29/407.01 |

FOREIGN PATENT DOCUMENTS

| | | |
|---|---|---|
| JP | 3477694 B2 | 12/2003 |
| JP | 3532528 B2 | 5/2004 |
| JP | 3626113 B2 | 3/2005 |
| JP | 2006-275722 A | 10/2006 |

OTHER PUBLICATIONS

Penner, A. Raymond. "The physics of golf." Reports on Progress in Physics 66.2 (2003): 131.*

* cited by examiner

*Primary Examiner* — Aniss Chad
(74) *Attorney, Agent, or Firm* — Sughrue Mion, PLLC

(57) ABSTRACT

A simulation method for evaluating the aerodynamic performance of a golf club head uses arithmetic operations executed by a computer to analyze air flow around the head of a golf club when the club is swung, and thereby estimates the aerodynamic forces which act on the club head. Because the aerodynamic properties of a golf club head are evaluated without relying on experimental evaluations using physical prototypes, this method enables the efficient development of golf clubs.

4 Claims, 12 Drawing Sheets

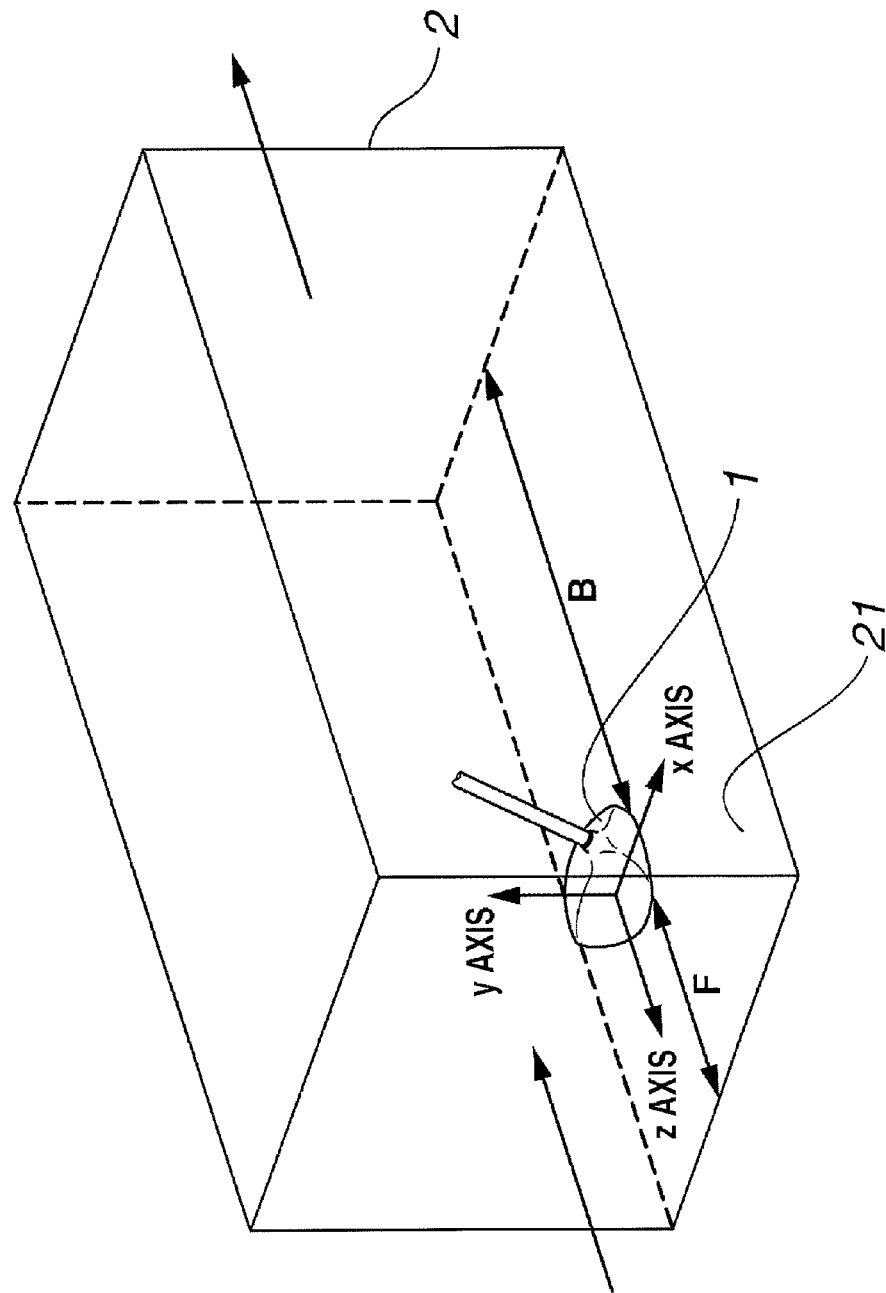

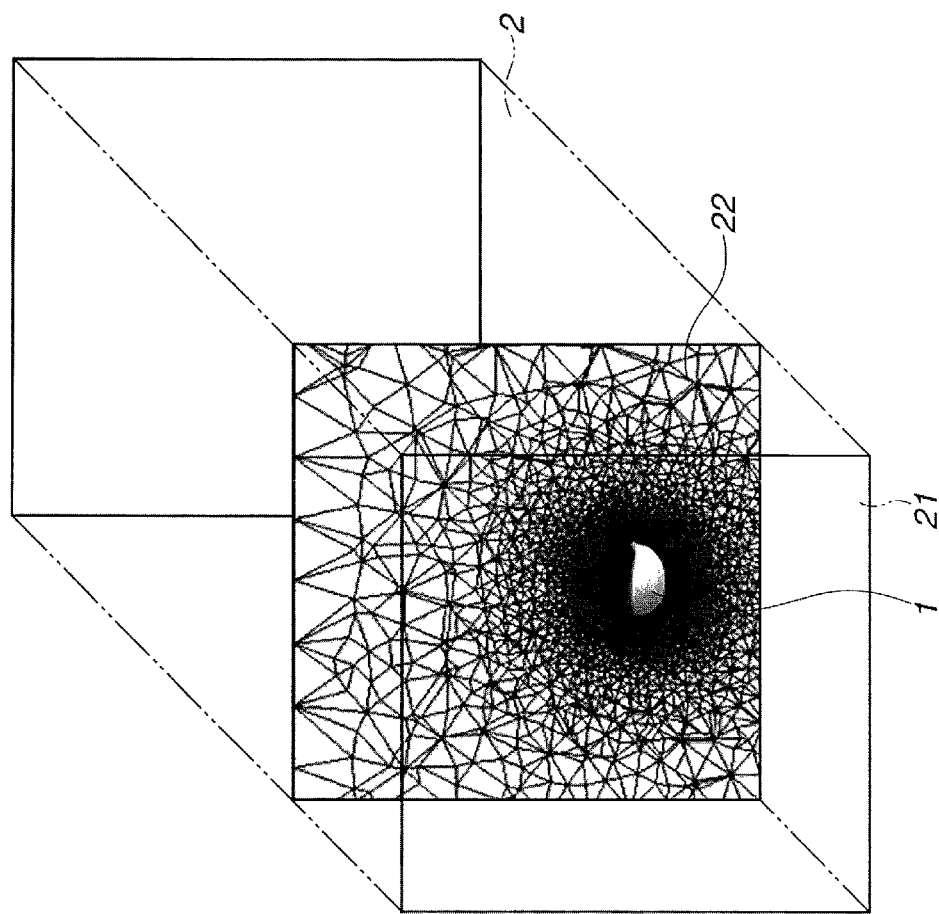

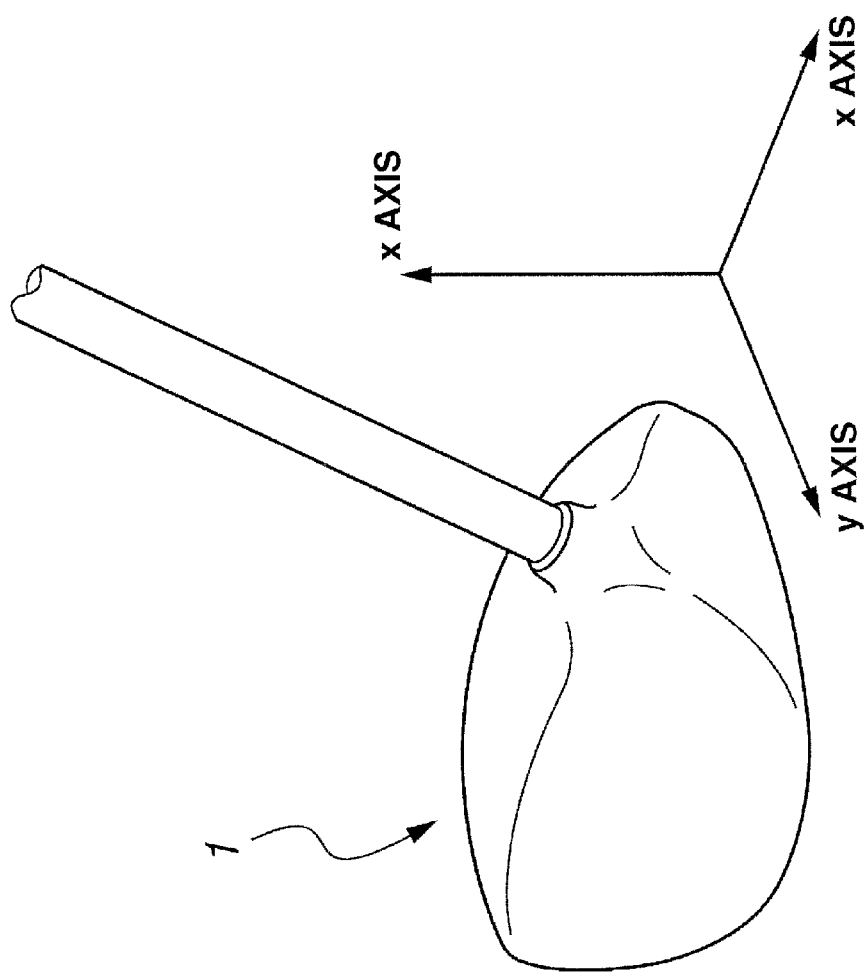

SIMULATION METHOD FOR EVALUATING A GOLF CLUB HEAD

CROSS-REFERENCE TO RELATED APPLICATION

This non-provisional application claims priority under 35 U.S.C. §119(a) on Patent Application No. 2010-287840 filed in Japan on Dec. 24, 2010, the entire contents of which are hereby incorporated by reference.

TECHNICAL FIELD

The present invention relates to a simulation method for evaluating the aerodynamic performance of a golf club head, which method uses arithmetic operations executed by a computer to analyze air flow around the head of a golf club when the club is swung and thereby estimates the aerodynamic forces which act on the club head.

BACKGROUND ART

When a golf club is swung, the head attached to the end of the club reaches a velocity of 40 to 50 m/s in the case of long clubs such as a driver. It is known that when a physical body travels through the air at such a high speed, airflow turbulence arises around the body. In this case, depending on the shape of the body, the turbulence of the air streams that flow around the body is complex and exerts a major influence on the motion of the body.

The head of a golf club, particularly on a wood club, has a three-dimensionally complex shape. Because the club head travels at a high speed as noted above, the shape is thought to exert a major influence on the aerodynamic properties and also to affect, for example, the "swing through" feel during the swing and the stability of the club head trajectory. For this reason, understanding the causal relationship between the club head shape and the aerodynamic properties contributes significantly to club development.

Generally, when investigating the changes in aerodynamic properties that arise from changes in the shape of a physical body such as a club head, numerous physical prototypes of differing shapes are actually fabricated and evaluations of the aerodynamic properties are carried out by performing wind tunnel tests to investigate changes in air flow or by investigating changes in club head trajectory and speed when the club is swung with a swing robot.

However, such experimental evaluation based on actual physical prototypes is time-consuming and costly, in addition to which it is difficult to arrive at a clear understanding of the aerodynamic properties from the resulting changes in air flow. Moreover, establishing a clear causal relationship between the aerodynamic properties and the club head performance is not always easy. Hence, club heads which have been newly designed based on evaluation results obtained by experimentation often fail to achieve the intended performance. In such cases, it is necessary each time to design and test-produce a new club head and determine its aerodynamic properties, resulting in further outlays of time and expense, and thus making efficient club development impossible.

No prior-art publications relevant to the present invention which concern club heads as in this application have been found, although prior art relating to the aerodynamic properties of golf balls include JP-A 2006-275722, JP 03626113, JP 03532528 and JP 03477694.

SUMMARY OF THE INVENTION

It is therefore an object of the present invention to provide a method which is capable of efficiently developing a golf club by evaluating the aerodynamic properties of the head on the golf club without relying on experimental evaluation using physical prototypes.

Accordingly, in a first aspect, the invention provides a simulation method for evaluating the aerodynamic performance of a golf club head by using arithmetic operations executed by a computer to analyze air flow around the club head when the club is swung and thereby estimating aerodynamic forces which act on the club head. The simulation method according to the first aspect of the invention includes the steps of:

(A) setting up, within a virtual space created in a computer, a club head model to be evaluated and a virtual airflow region surrounding a periphery of the club head model;

(B) setting up, on a bottom side of the virtual airflow region, a wall representing a ground surface, thereby making the bottom side of the virtual airflow region a closed side, and establishing a clearance between the club head model and the ground surface;

(C) dividing the virtual airflow region into a plurality of grid cells in a manner such that the grid cells gradually increase in volume in a direction leading away from a surface of the club head model;

(D) establishing a state in which an air stream of a predetermined speed flows into the virtual airflow region from in front of the club head model and, letting this state represent the state when the club head model moves through the air at the predetermined speed on being swung, calculating for each grid cell the speed, direction and pressure of the air stream that forms within the virtual airflow region; and (E) integrating the air stream speed, direction and pressure calculated for each individual grid cell, and computing the aerodynamic forces which have been generated by the air stream and which act on the club head model in the virtual airflow region.

In a second aspect, the invention provides a simulation method for evaluating the aerodynamic performance of a golf club head by using arithmetic operations executed by a computer to analyze air flow around the club head when the club is swung and thereby estimating aerodynamic forces which act on the club head. The simulation method according to the second aspect of the invention includes the steps of:

(A) setting up, within a virtual space created in a computer, a club head model to be evaluated and a virtual airflow region surrounding a periphery of the club head model;

(B) setting up, on a bottom side of the virtual airflow region, a wall representing a ground surface, thereby making the bottom side of the virtual airflow region a closed side, and establishing a clearance between the club head model and the ground surface;

(C) dividing the virtual airflow region into a plurality of grid cells in a manner such that the grid cells gradually increase in volume in a direction leading away from a surface of the club head model;

(D) establishing a state in which an air stream of a predetermined speed flows into the virtual airflow region from in front of the club head model and, letting this state represent the state when the club head model moves through the air at the predetermined speed on being swung, calculating for each grid cell the speed, direction and pressure of the air stream that forms within the virtual airflow region;

(E) integrating the air stream speed, direction and pressure calculated for each individual grid cell, and computing the aerodynamic forces which have been generated by the air stream and which act on the club head model in the virtual airflow region;

(F) creating a reference map by repeatedly carrying out steps (A) to (E) at differing clearances and air stream speeds, and mapping the results obtained at the respective clearances and air stream speeds; and (G) estimating, from the reference map, the aerodynamic forces which act on the club head at a predetermined clearance and a predetermined speed.

The simulation method according to the first or second aspect of the invention may further include the step of, letting a left/right direction of the club head be the x axis, letting a vertical direction of the club head be the y axis and letting a front/back direction of the club head be the z axis, estimating the aerodynamic forces in each of the x-, y- and z-axis directions which act on the club head.

The simulation method according to the first or second aspect of the invention may further include the step of providing surface irregularities representing grass on the wall representing a ground surface that has been set up on the bottom side of the virtual airflow region.

The simulation method according to the first or second aspect of the invention may further include the step of evaluating the aerodynamic performance of a wood club head.

In a third aspect, the invention provides a simulation method for evaluating a golf club head, which method includes the step of, based on the air stream speed, direction and pressure obtained from the simulation method of the first aspect of the invention, analyzing the distribution of pressure due to air flow around the club head model during swing by visualization using isobaric lines or isobaric surfaces.

In a fourth aspect, the invention provides a simulation method for evaluating a golf club head, which method includes the step of, based on the air stream speed, direction and pressure obtained from the simulation method of the first aspect of the invention, analyzing air flow around the club head model during swing by visualization using stream lines, path lines, particle traces or volume rendering of the air flow.

These simulation methods for evaluating a club head, by analyzing air flow around the club head when a golf club is swung, are able to estimate the aerodynamic forces which act upon the club head and thus evaluate the aerodynamic performance of the club head, without the need to conduct experimental evaluations using physical prototypes. In the present invention, by setting up a ground surface, air flow similar to when a ball is actually shot (when there is a ground surface) can be analyzed, enabling a more accurate estimate to be carried out. In addition, because the clearance between the ground surface and the bottom side of the club head is also established, analysis and evaluation for a variety of golfers is possible.

Therefore, the simulation method for evaluating a club head according to the present invention, by evaluating the aerodynamic properties of a designed club head without the need to carry out experimental evaluations using physical prototypes, makes it possible to efficiently develop a golf club.

ADVANTAGEOUS EFFECTS OF INVENTION

With the simulation method for evaluating a club head according to the present invention, the aerodynamic forces which act upon the club head when a golf club is swung at a predetermined velocity can be estimated. Hence, a club head having a complex shape can be evaluated without relying on experimental evaluation using a physical prototype, thus enabling the "swing through" feel and the stability of the club head trajectory to be estimated and evaluated.

As a result, the time required to evaluate a club head shape is shortened, in addition to which the accuracy and objectivity of the evaluation are increased, thus making it possible to efficiently develop a higher performance product for the type and grade of club.

BRIEF DESCRIPTION OF THE DIAGRAMS

FIG. 1 is a schematic perspective diagram illustrating a club head model and a virtual airflow region in the method of the invention.

FIG. 2 is a schematic diagram showing a cross-sectional view passing through the center of the club head model in FIG. 1.

FIG. 3 is a perspective view showing an example of a club head model in the invention.

DETAILED DESCRIPTION OF THE INVENTION

Figure 4A:
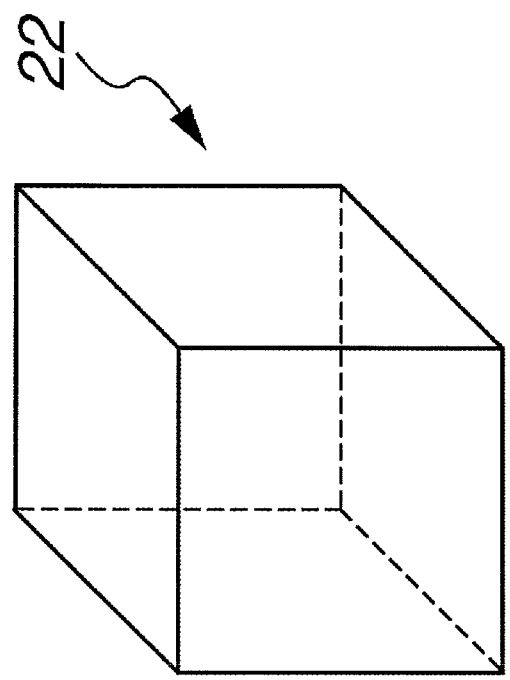
FIG. 4 is a diagram showing specific examples of the shapes of grid cells formed in the virtual airflow region in the invention.

The objects, features and advantages of the invention will become more apparent from the following detailed description, taken in conjunction with the foregoing diagrams.

The simulation method of the invention is a method which uses arithmetic operations executed by a computer to analyze air flow around the club head when a golf club is swung and thereby estimate the aerodynamic forces which act on the club head.

In the simulation method of the invention, first, (A) a club head model having a predetermined shape and a virtual airflow region which surrounds a periphery of the club head model are set up within a virtual space created in a computer.

FIGS. 1 and 2 show an example illustrating the setting up of the club head model and the virtual airflow region by computer.

FIG. 1 is a schematic perspective view showing an example of a state in which a club head model and a virtual airflow region have been set up within a virtual space. FIG. 2 is a cross-sectional view passing through the center of the club head model in FIG. 1, this being a schematic view showing an example of grid cells.

In this invention, first, as shown in FIG. 1, (A) a club head model 1 and a virtual airflow region 2 are set up within a virtual space. This club head model 1 may be created by, for example, 3D CAD, as shown in FIG. 3. The virtual airflow region 2 may be set up as a rectangular parallelepiped-shaped region which extends three-dimensionally in the x-axis, y-axis and z-axis directions from the center of the club head model 1 and has a range in each of these axial directions which is from ±5 to ±150 times the size of the club head model 1. Although it is necessary for this virtual airflow region 2 to be of such an extent as to encompass substantially all air flow around the club head that affects movement by the club head, because air flow at a distance from the golf club has little influence on golf club movement and because the simulation precision decreases when the size of the virtual airflow region is too small, from the standpoint of the efficiency and precision of simulation, it is preferable for the size of the virtual airflow region 2 to be within the above-indicated range.

Here, the virtual airflow region 2, although not subject to any particular limitation, is preferably set so that, as shown in FIG. 1, a backward side B of the club head model 1 is longer than a forward side F. That is, it is preferable to have the forward side where the range of change in air flow is relatively small be short in order to shorten the computational time, and to have the backward side where changes in air flow readily arise be long in order to increase the precision. One example that may be given by way of illustration is a parallelepiped in which the forward side F has been set to a length of 50 cm and the backward side B has been set to a length of 1 m.

Next, although not clearly shown in FIG. 1, (B) a wall representing a ground surface is set up on a bottom side 21 of the virtual airflow region 2, thereby making the bottom side of this virtual airflow region a closed side, and a clearance is established between the closed side (bottom side) 21 and the bottom side of the club head 1.

Here, although not subject to any particular limitation, surface irregularities representing grass may be provided on the wall 21 representing a ground surface that has been set up on the bottom side of the virtual airflow region 2, thereby enabling the simulation to be carried out at settings which are closer to conditions of actual use. The club head model 1 may be in the form of a wood-type club head, an iron-type club head, or a club head having some other shape. However, the inventive method of simulation is especially preferable for simulations of wood-type club heads which are used in a high head-speed range and the aerodynamic properties of which have a large influence on the performance and the feel during use.

Next, as shown in FIG. 2, (C) the virtual airflow region 2 is divided into a plurality of grid cells 22 in a manner such that the grid cells gradually increase in volume in a direction leading away from a surface of the club head model.

Specifically, first, the surface of the club head model 1 is divided into cells measuring, for example, about 0.002 mm on a side, thereby setting up a large number of polygonal (e.g., triangular, quadrangular) or substantially polygonal (e.g., substantially triangular, substantially quadrangular) face cells. In addition, grid cells adjoining the club head model surface composed entirely of these individual face cells are set up. The grid cells adjoining the club head model surface are set up in a substantially polygonal prismatic shape such as a substantially quadrangular prismatic shape, or in a substantially polygonal pyramidal shape. Also, as shown in FIG. 2, from the grid cells adjoining the club head model surface, the remainder of the virtual airflow region 2 is divided grid-like into cells in such a way that the volume of the grid cells 22 gradually increases in directions leading away from the club head model 1. The entire virtual airflow region 2 is divided in this way into grid cells 22.

Figure 4B:
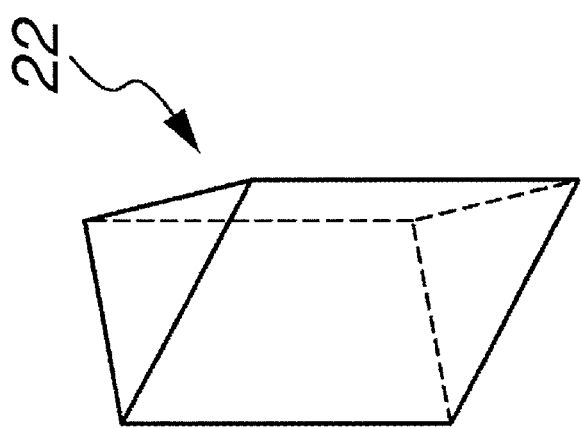
Figure 4C:
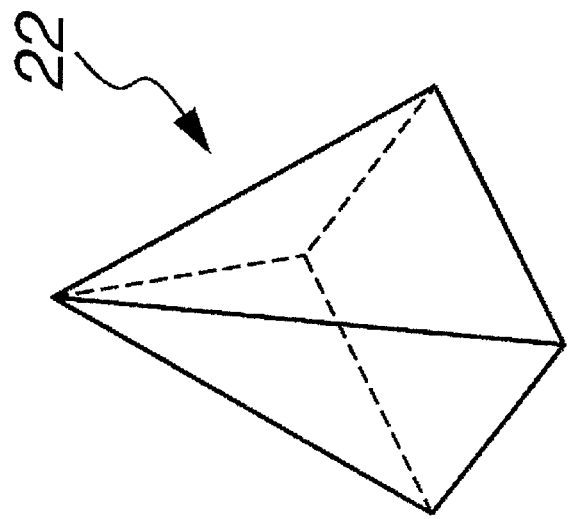
Figure 4D:
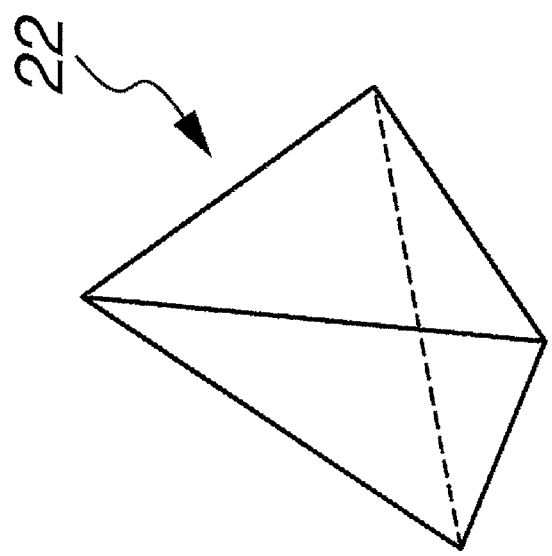

The shapes of the grid cells 22 formed in the remainder of the virtual airflow region other than the grid cells adjoining the surface of this club head model 1 are exemplified by polyhedrons such as the hexahedron shown in FIG. 4A, the triangular prismatic pentahedron shown in FIG. 4B, the quadrangular pyramidal pentahedron shown in FIG. 4C, and the triangular pyramidal tetrahedron shown in FIG. 4D. These grid cells 22 may be set up in suitable combinations thereof.

Because the air flow around the club head has a greater influence when close to the club head, as shown in FIG. 2, the grid cells are set up in a manner such as to be finer near the club head model 1 and coarser away from the club head model 1 where the influence exerted by the air flow is small. The increase in the volume of the grid cells in directions leading away from the surface of the club head model 1 may be continuous or stepwise.

Next, (D) a state is established in which an air stream of a predetermined speed corresponding to the head speed that is assumed flows into the virtual airflow region 2 from in front of the club head model 1. Letting this state represent the state of club head movement when the golf club is swung at a predetermined speed, the speed, direction and pressure of the air stream that forms within the virtual airflow region 1 are calculated for each grid cell.

That is, in the simulation method of the invention, simulation is carried out by assuming a state in which an air stream of a predetermined speed flows into the virtual airflow region 2 from in front of the club head model 1, such as a state in which, as shown by the arrows in FIG. 1, an air stream flows into the virtual airflow region 2 from in front of the club head model 1 and flows out of the virtual airflow region 2 from in back of the club head model 1, to be the state at the time that the club head, when a golf club is swung, moves through the atmosphere at a predetermined head speed and reaches a bottommost point which most closely approaches the ground.

Next, an analysis of the elements of motion, within the virtual airflow region, of the air stream generated by forces which arise from the air flow that comes into contact with the club head model 1 and which act on the surface of the club head model 1 is carried out for each grid cell.

The elements of motion that arise when air flows into the virtual airflow region 2 and comes into contact with the club head model 1 are the speed of the air stream in each axial direction in a three-dimensional spatial coordinate system, the direction of the air stream, and the pressure of the air stream against the surface of the club head model 1. These elements of motion can be calculated by substituting numerical values into the basic equations used for computation; namely, the equations of continuity (1) to (3) below corresponding to the law of conservation of mass, and the Navier-Stokes equations (4), (5) and (6) below corresponding to the law of conservation of momentum by a physical body.

$$\frac{\partial \rho}{\partial t} + \frac{\partial (\rho u)}{\partial x} + \frac{\partial (\rho v)}{\partial y} + \frac{\partial (\rho w)}{\partial z} = 0 \qquad (1)$$

$$div V + \frac{\partial (\rho u)}{\partial x} + \frac{\partial (\rho v)}{\partial y} + \frac{\partial (\rho w)}{\partial z} \qquad (2)$$

where u, v and w are the velocities in the x, y and z directions, respectively.

Using the divergence operator, $$\frac{\partial \rho}{\partial t} + div(\rho V) = 0. \qquad (3)$$

Letting the mass force be F, $$\frac{Du}{Dt} = F_x - \frac{1}{\rho}\frac{\partial p}{\partial x} + \frac{\mu}{\rho}\left[\frac{\partial^2 u}{\partial x^2} + \frac{\partial^2 u}{\partial y^2} + \frac{\partial^2 u}{\partial z^2}\right] + \frac{1}{3}\frac{\mu}{\rho}\frac{\partial}{\partial x}\left[\frac{\partial u}{\partial x} + \frac{\partial v}{\partial y} + \frac{\partial w}{\partial z}\right] \qquad (4)$$

$$\frac{Dv}{Dt} = F_y - \frac{1}{\rho}\frac{\partial p}{\partial x} + \frac{\mu}{\rho}\left[\frac{\partial^2 v}{\partial x^2} + \frac{\partial^2 v}{\partial y^2} + \frac{\partial^2 v}{\partial z^2}\right] + \frac{1}{3}\frac{\mu}{\rho}\frac{\partial}{\partial y}\left[\frac{\partial u}{\partial x} + \frac{\partial v}{\partial y} + \frac{\partial w}{\partial z}\right] \qquad (5)$$

$$\frac{Dw}{Dt} = \qquad (6)$$
$$F_z - \frac{1}{\rho}\frac{\partial p}{\partial z} + \frac{\mu}{\rho}\left[\frac{\partial^2 w}{\partial x^2} + \frac{\partial^2 w}{\partial y^2} + \frac{\partial^2 w}{\partial z^2}\right] + \frac{1}{3}\frac{\mu}{\rho}\frac{\partial}{\partial z}\left[\frac{\partial u}{\partial x} + \frac{\partial v}{\partial y} + \frac{\partial w}{\partial z}\right]$$

where ρ is the air density, p is the air pressure, and μ is the air viscosity.

In a simulation where air flows around the club head model 1 in the direction of the arrows as shown in FIG. 1, the flow of air may be analyzed for each of the grid cells 22 in the virtual airflow region 2 by arithmetic operations. Using the above equations (1) to (6) for the arithmetic operations, equations (1) to (6) can be discretized according to the division of the virtual airflow region 2 into grid cells 22, and the operations carried out. The method of simulation may be suitably selected from among, e.g., finite difference calculus, finite volume methods, boundary element methods and finite element methods, and carried out while taking parameters such as the simulation conditions into account.

Next, (E) the air stream speed, direction and pressure calculated for each individual grid cell 22 are integrated, and the forces which have been generated by the air stream and which act on the club head model 1 in the virtual airflow region 2 are computed. Here, the forces which act on the club head model 1 may be determined by, for example, as shown in FIG. 3, letting a left-right direction of the club head 1 be the x axis, letting a vertical direction be the y axis and letting a front/back direction (direction of advance) of the club head 1 be the z axis, and computing the force components in these three directions.

In this case, using a scattering model for the air stream, the forces in the x-axis direction, y-axis direction and z-axis direction can be calculated by substituting speed values that take into account the degree of turbulence.

Alternatively, the above-described steps (A) to (E) may be followed by the steps of: (F) creating a reference map by repeatedly carrying out steps (A) to (E) at differing clearances and air stream speeds, and mapping the results obtained at the respective clearances and air stream speeds; and (G) estimating, from the reference map, the forces acting on the club head at a predetermined clearance and a predetermined speed.

In addition, it is also possible to use the simulation method of the invention to analyze the airflow state and pressure state around the club head at the time of the swing. Specifically,
(i) based on the air stream speed, direction and pressure obtained from the above-described simulation method, the distribution of pressure due to air flow around the club head model during swing may be analyzed by visualization using isobaric lines or isobaric surfaces; or
(ii) based on the air stream speed, direction and pressure obtained from the above-described simulation method, air flow around the club head model during the swing may be analyzed by visualization using stream lines, path lines, particle traces or volume rendering of the air flow.

Figure 6:
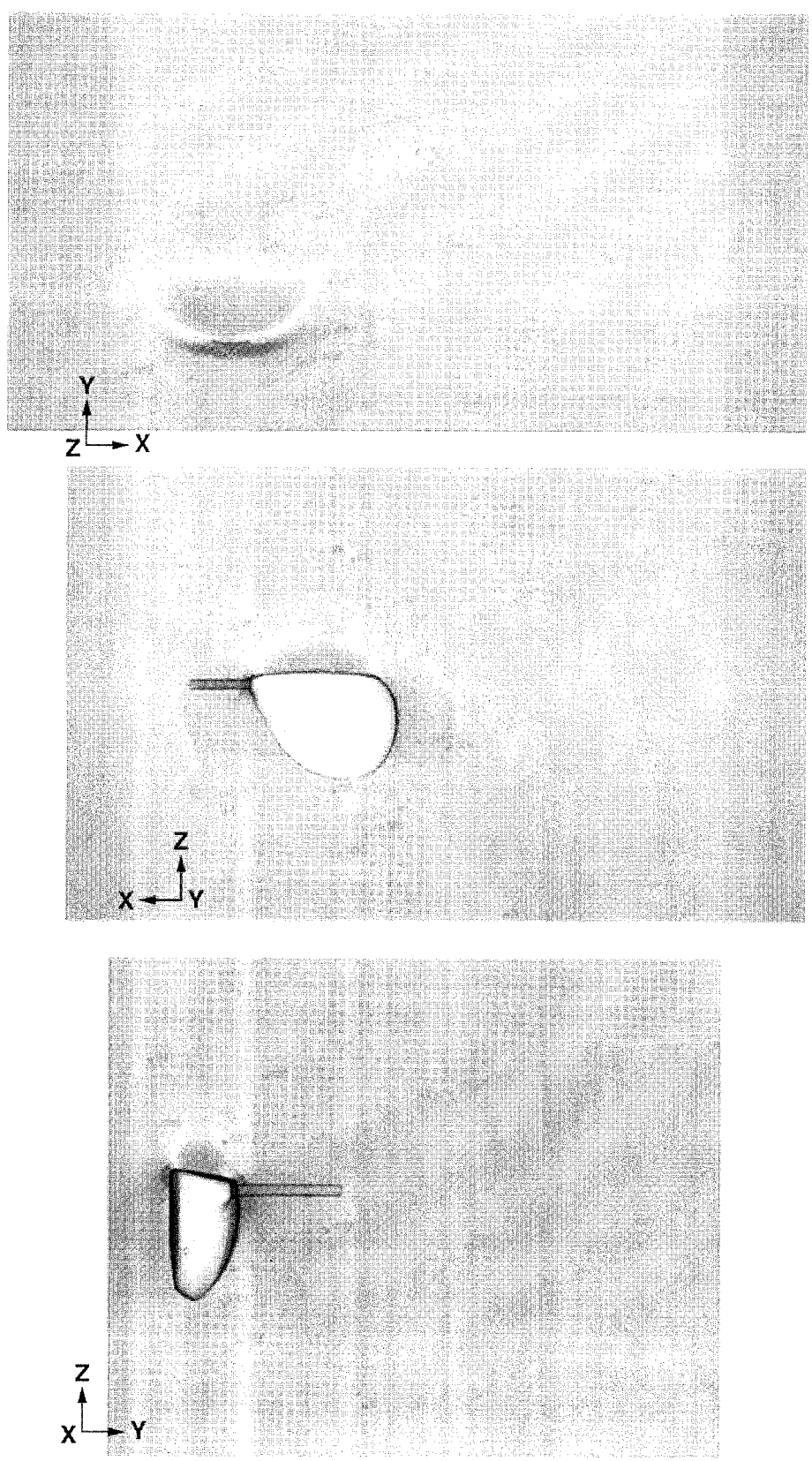
FIG. 6 shows diagrams which, based on the air stream speed, direction and pressure obtained from the simulation in Example 1, use isobaric lines to visualize the distribution of pressure due to air flow around the club head model during the swing.
Figure 7:
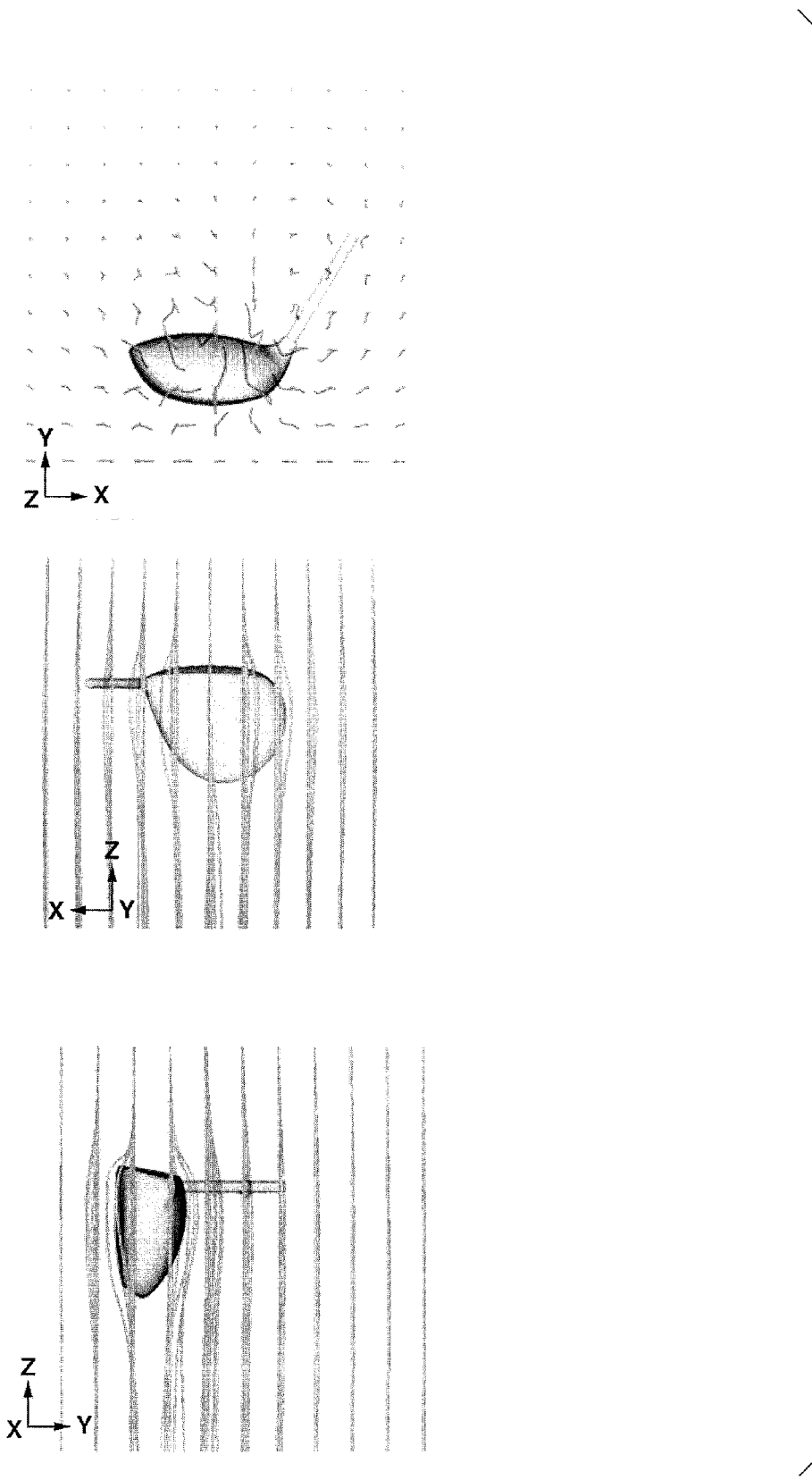
FIG. 7 shows diagrams which, based on the airstream speed, direction and pressure obtained from the simulation in Example 1, use stream lines to visualize the air flow around the club head model during the swing.
Figure 8:
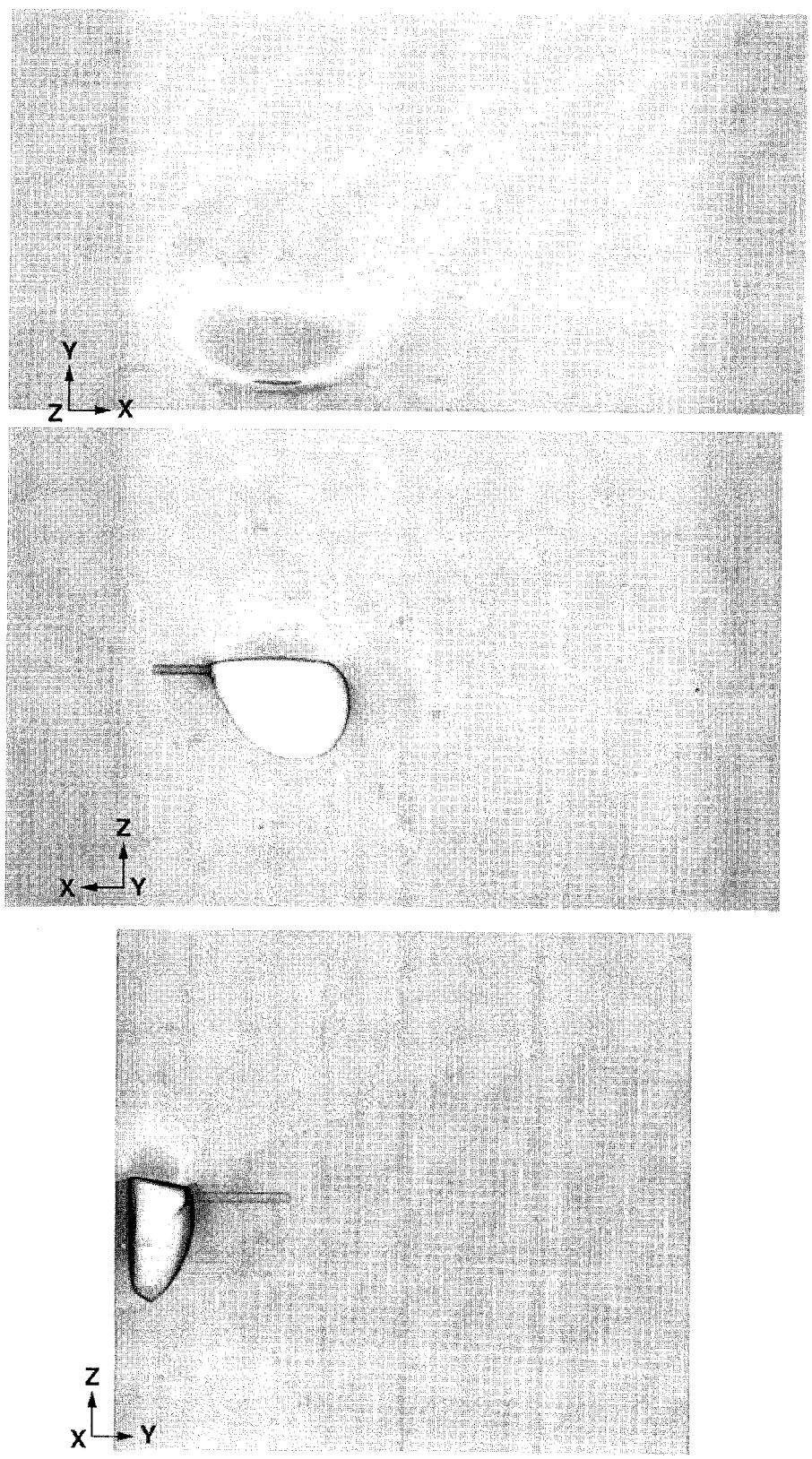
FIG. 8 shows diagrams which, based on the air stream speed, direction and pressure obtained from the simulation in Example 2, use isobaric lines to visualize the distribution of pressure due to air flow around the club head model during the swing.
Figure 9:
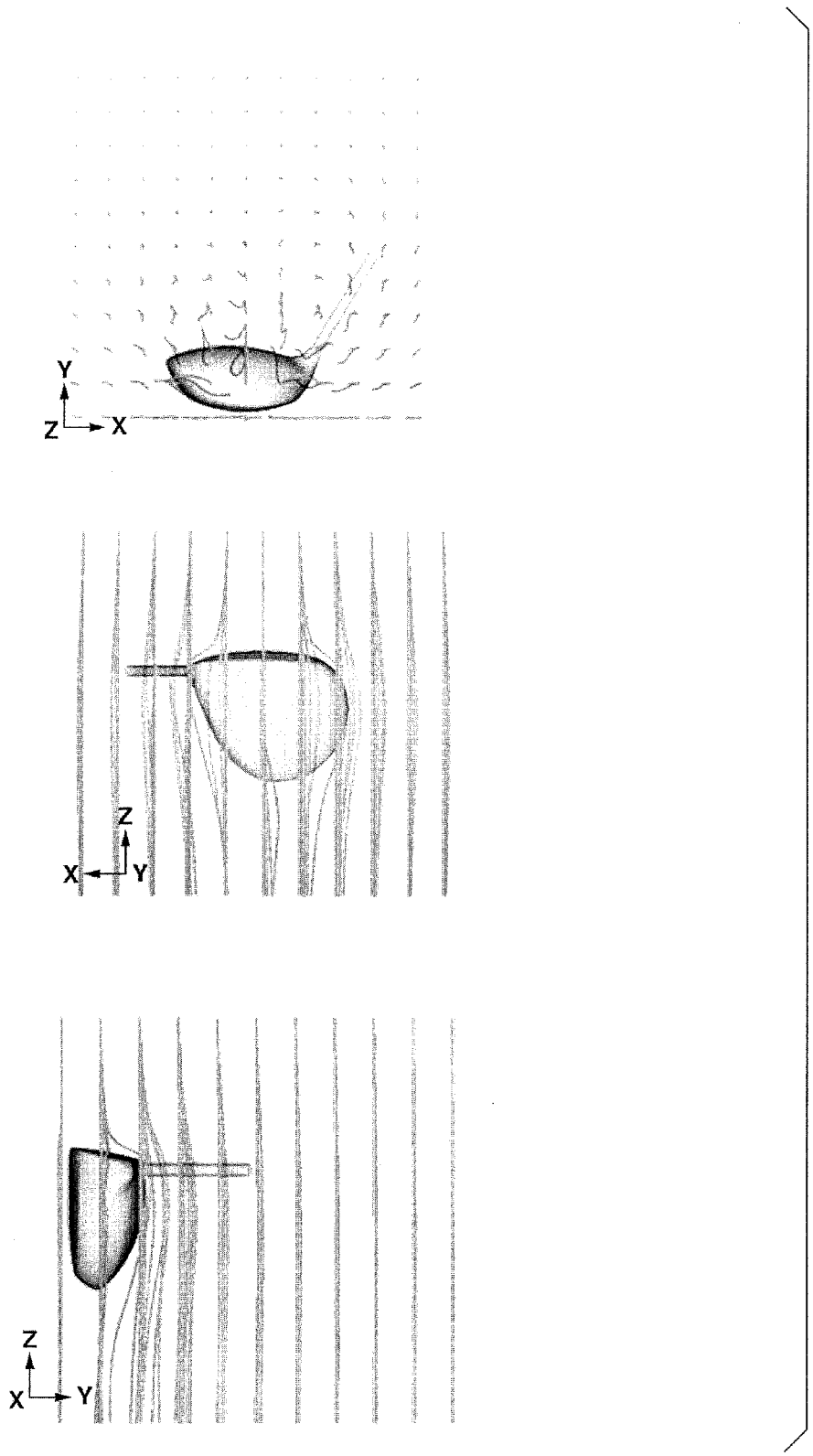
FIG. 9 shows diagrams which, based on the airstream speed, direction and pressure obtained from the simulation in Example 2, use stream lines to visualize the air flow around the club head model during the swing.

FIGS. 6 and 8 show examples in which the distribution of pressure due to air flow around the club head model is visualized using isobaric lines, and FIGS. 7 and 9 show examples in which air flow around the club head model during the swing is visualized using stream lines.

EXAMPLES

The following Examples of the invention are provided by way of illustration and not by way of limitation.

Example 1

A virtual airflow region and a club head model similar to those shown in FIG. 1 were set up in a computer by setting up, within a virtual space created in a computer, a club head model of the shape shown in FIGS. 6 and 7 and a virtual airflow region surrounding the periphery of the club head model, and by also setting up, on a bottom side of the virtual airflow region, a wall representing a ground surface, thereby making the bottom side of the virtual airflow region a closed side, and setting the clearance between the club head model and the ground surface to 50 mm. The dimensions of the virtual airflow region were set as follows: the vertical and left/right dimensions were each set to 1 m, the length F in front of the club head model was set to 50 cm, and the length B in back of the club head model was set to 1 m. The left/right direction of the club head model was set as the x axis, the vertical direction of the club head model was set as the y axis, and the front/back direction (direction of advance) of the club head model was set as the z axis.

Next, the virtual airflow region was divided into a plurality of grid cells in a manner such that the grid cells gradually increased in volume in a direction leading away from a surface of the club head model, a plurality of grid cells was set up in the virtual airflow region in a manner like that shown in FIG. 2, a state was established in which an air stream having a velocity of 40 m/s (−40 m/s in z-axis direction) flows into the virtual airflow region from the front thereof and flows out toward the back thereof and, letting this state represent the state of the club head at the bottommost point of the swing when the club is swung at a head speed of 40 m/s, the speed, direction and pressure of the air stream that forms in the virtual airflow region were calculated for each grid cell.

Figure 5:
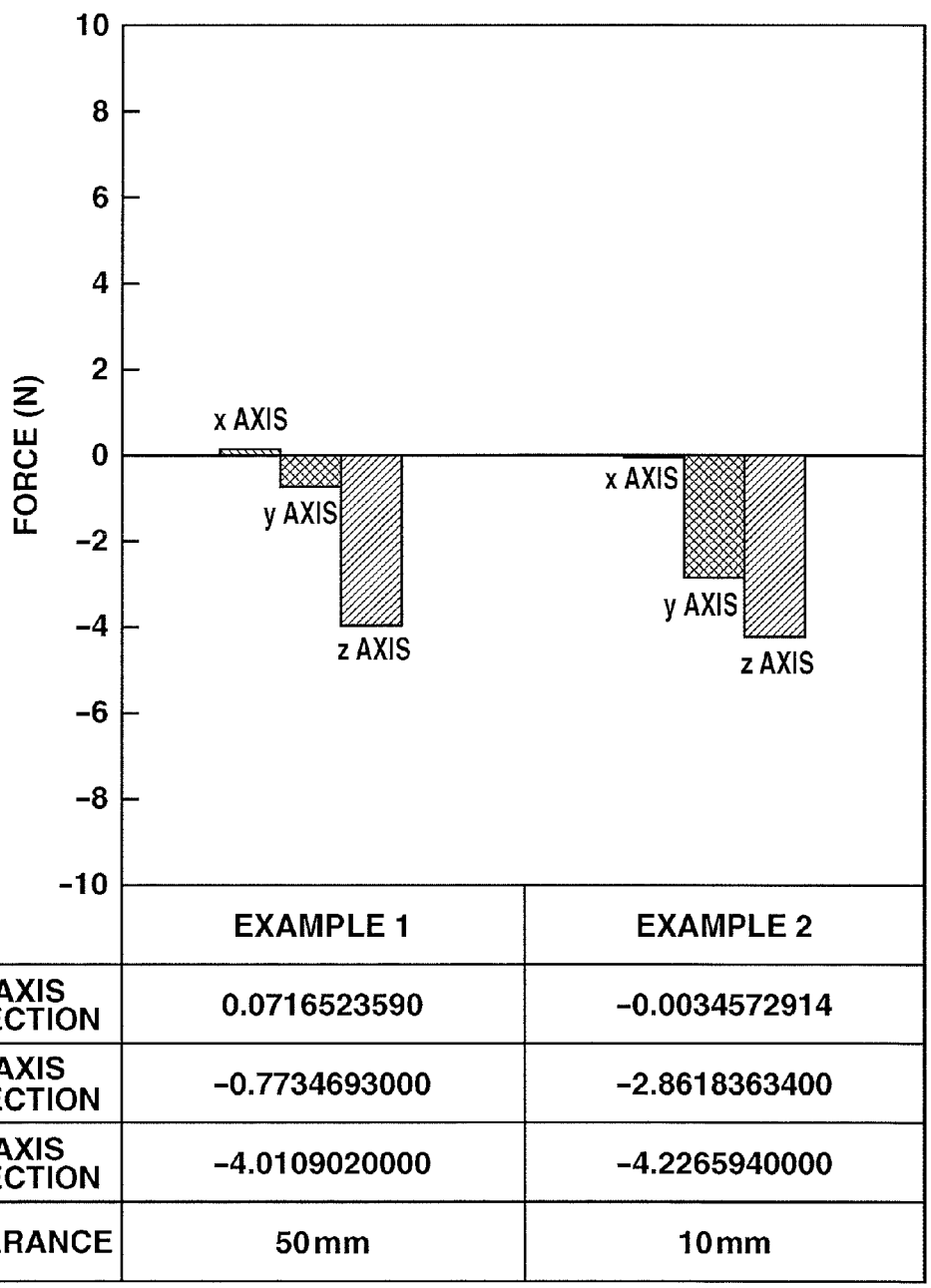
FIG. 5 is a graph showing the forces acting on a club head, as estimated by the simulations carried out in Examples 1 and 2.

The air flow speed, direction and pressure calculated for each grid cell were then integrated, and the x-axis direction, y-axis direction and z-axis direction forces acting upon the club head model within the virtual airflow region were computed. The results are shown in FIG. 5.

In addition, based on the air stream speed, direction and pressure obtained, the distribution in pressure due to air flow around the club head model during the swing was visualized using isobaric lines, or stream lines of the same air flow were visualized. FIG. 6 shows the pressure distribution, and FIG. 7 shows the stream lines.

Example 2

Aside from setting the clearance between the club head model and the ground surface to 10 mm, the x-axis direction, y-axis direction and z-axis direction forces acting upon the club head model were calculated in the same way as in Example 1. The results are shown in the graph in FIG. 5. Also, as in Example 1, the distribution in pressure due to air flow around the club head model was visualized by isobaric lines or isobaric surfaces, or stream lines of the same air flow were visualized. FIG. 8 shows the pressure distribution, and FIG. 9 shows the stream lines.

Observations Concerning Examples 1 and 2

As shown in the graph in FIG. 5, the x-axis direction, y-axis direction and z-axis direction forces each vary depending on the clearance with the ground, confirming that it is possible with the simulation method of the invention to evaluate the aerodynamic performance of the club head by estimating the aerodynamic forces which act upon the club head when a golf club is swung. Therefore, by setting the clearance, it is possible to analyze and evaluate in detail the influence of the forces incurred by the golf club due to the height of the tee (the clearance with the ground at the time of the swing), such as for a golfer who tees the ball high or a golfer who tees the ball low.

Japanese Patent Application No. 2010-287840 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A simulation method for evaluating the aerodynamic performance of a golf club head by using arithmetic operations executed by a computer to analyze air flow around the club head when the club is swung and thereby estimating aerodynamic forces which act on the club head, comprising the steps of:
   (A) setting up, within a virtual space created in a computer, a club head model to be evaluated and a virtual airflow region surrounding a periphery of the club head model;
   (B) setting up, on a bottom side of the virtual airflow region, a wall representing a ground surface, thereby making the bottom side of the virtual airflow region a closed side, and establishing a clearance between the club head model and the ground surface;
   (C) dividing the virtual airflow region into a plurality of grid cells in a manner such that the grid cells gradually increase in volume in a direction leading away from a surface of the club head model;
   (D) establishing a state in which an air stream of a predetermined speed flows into the virtual airflow region from in front of the club head model and, letting said state represent the state when the club head model moves through the air at the predetermined speed on being swung, calculating for each grid cell the speed, direction and pressure of the air stream that forms within the virtual airflow region;
   (E) integrating the air stream speed, direction and pressure calculated for each individual grid cell, and computing the aerodynamic forces which have been generated by the air stream and which act on the club head model in the virtual airflow region;
   (F) creating a reference map by repeatedly carrying out steps (A) to (E) at differing clearances and air stream speeds, and mapping the results obtained at the respective clearances and air stream speeds; and
   (G) estimating, from the reference map, the aerodynamic forces which act on the club head at a predetermined clearance and a predetermined speed.

2. The simulation method of claim 1, further comprising the step of, letting a left/right direction of the club head be the x axis, letting a vertical direction of the club head be the y axis and letting a front/back direction of the club head be the z axis, estimating the aerodynamic forces in each of the x-, y- and z-axis directions which act on the club head.

3. The simulation method of claim 1, further comprising the step of providing surface irregularities representing grass on the wall representing a ground surface that has been set up on the bottom side of the virtual airflow region.

4. The simulation method of claim 1, further comprising the step of evaluating the aerodynamic performance of a wood club head.

* * * * *